March 29, 1932.   E. J. PRESTON ET AL   1,851,403

LATHE CHUCK

Original Filed Feb. 26, 1929

Inventors
E. J. Preston
W. C. Fletcher
A. W. Reynolds Jr.

By Linton, Kellogg + Smith.
Attorneys

Patented Mar. 29, 1932

1,851,403

UNITED STATES PATENT OFFICE

EARL J. PRESTON, WILLIAM C. FLETCHER, AND ALBERT W. REYNOLDS, JR., OF PRINCETON, WEST VIRGINIA, SAID FLETCHER ASSIGNOR TO SAID PRESTON

LATHE CHUCK

Application filed February 26, 1929, Serial No. 342,832. Renewed February 13, 1932.

This invention relates to improvements in lathe chucks, having for an object to provide a chuck of the character mentioned, so constructed that the same will function to receive and secure a piece to be machined in properly centered position on an equipped lathe and furthermore, will effect a material saving of time and labor in "set-up" preparations as when a piece is secured in working position through the usage of those types of multiple jaw chucks, now prevalent in this art.

Another and equally important object of the invention may be stated to provide a lathe chuck that will be especially advantageous for use in securing the so-called pop valve of steam let-off safety appliances, now widely used in connection with the steam boilers of locomotives during a grinding or reconditioning of the same, allowing the valves to be accurately centered upon the lathe and to be securely retained without the forming of chuck jaw markings thereon which, necessitate a deeper grinding of the valves to effect contact or seat portions thereupon, and the resultant forming of pressures therein, consequently, interfering with proper operation of such valves.

Yet another object of the invention may be stated to reside in the provision of a chuck having reducer or adapter means capable of ready insertion therein, whereby valves of smaller size may be effectually engaged and retained therein.

Other objects of the invention will be in part obvious and in part pointed out hereinafter.

In order that the invention and its mode of operation may be readily understood by persons skilled in the art, we have in the accompanying illustrative drawings, and in the detailed following description based thereon, set out several possible embodiments of the same.

In these drawings:—

Figure 1:
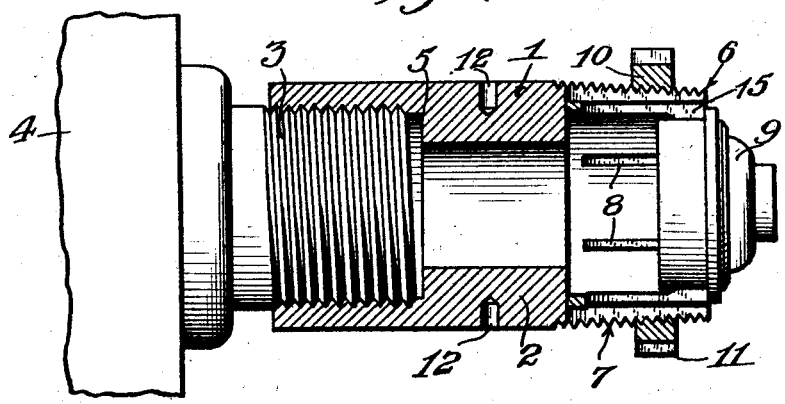
Figure 1 is a longitudinal section through the improved chuck showing the engagement of a portion of a pop valve therein together with the usage of a reducer or adapter device.

Having more particular reference to the drawings, in connection with which like characters of reference will designate corresponding parts throughout, the improved chuck may be stated to comprise a cross sectionally circular tubular or sleeve-like metal body indicated in its entirety herein by the numeral 1, said body being formed with an intermediately thickened portion 2, while an internally screw threaded socket is formed upon the lathe receiving end thereof in order that effectual connection as between a chuck and the screw threaded portion 3 of the spindle of a lathe 4 may be engaged or turned thereinto, as is clearly shown in the Figure 1; a shoulder portion 5 being formed adjacent the inner extremity of the screw threaded socket, aforesaid, for limiting the extent of engagement of the screw threaded lathe spindle in the same.

The opposite or remaining end of the chuck body 1 is formed with a cross sectionally circular and tapered work piece receiving means 6 having the outer peripheral surface thereof screw threaded as at 7 and being formed with a plurality of relatively spaced longitudinally disposed slots 8 whereby to divide the work piece receiving means of the chuck into a plurality of segmental arms capable of being flexed with respect to the chuck body 1, for a purpose that will be presently described.

In order that the segmental chuck arms of the work piece receiving means 6 may be flexed and brought into binding and retaining engagement with a pop valve engaged therein, somewhat after the fashion of the valve indicated herein by the numeral 9, we provide an adjusting and locking spanner nut 10, forming the usual spanner wrench receiving slots or notches 11 in its outer peripheral surface whereby to permit of effectual engagement of a wrench therewith and the rotating of such spanner nut 10 to operative or inoperative positions, as may be required during the usage of the improved device.

Figure 2:
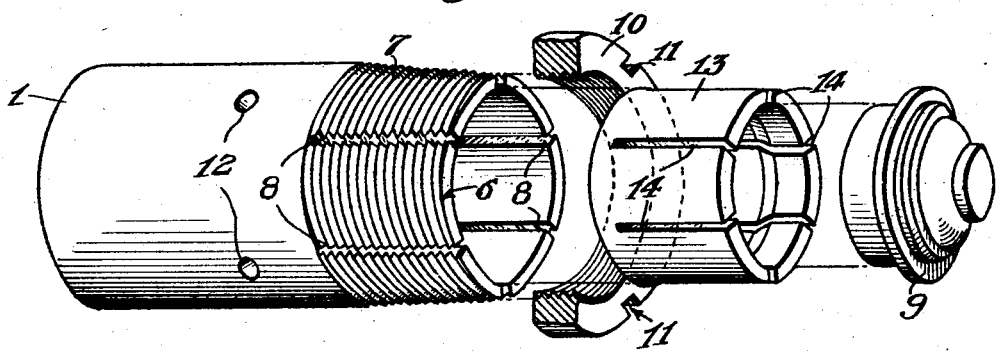
Figure 2 is a disassembled detail in perspective and partly in section, illustrating the construction of the improved chuck, the manner in which a reducer or adapter device is adapted to be engaged therein, and the manner in which a pop valve is engaged.

To facilitate a quick and convenient engagement of the internally screw threaded socket portion of the chuck body 1 with the screw threaded lathe spindle 3, we may and preferably form spanner wrench receiving pockets or recesses 12 in the outer peripheral portion of the thickened intermediate portion 2 of said chuck body 1, arranging these pockets in relatively spaced relation, as is clearly shown in the Figures 1 and 2.

Under certain working conditions, it becomes desirable that the improved chuck shall be provided with reducer or adapter means, in order that the same may be effectually used in connection with smaller sizes of pop valves, such as is illustrated in the Figures 1 and 2 and identified by the numeral 9. To this end, the reducer or adapter means so provided, may be stated to comprise cross sectionally circular sleeve or tubular-like spring metal elements, one of which is shown herein and indicated in its entirety by the numeral 13; said adapter being formed with a plurality of longitudinally disposed equi-spaced slots 14 opening onto one marginal portion of the adapter and hence, providing such adapter with a plurality of flexible or spring segmental gripping or work piece receiving arms. The diameter of the adapter 13 is such that it will be assured of snug longitudinal and slidable engagement in the work receiving means 6 of the improved chuck, in the fashion as is shown in the Figure 1, the segmental gripping and securing portions thereof being faced outwardly, as is shown in the Figures 1 and 2, while an inner peripherally disposed shoulder or lip 15 is formed upon the segment portions of the adapted and serves to permit of the snug engagement of the peripheral or barrel-like portion of the pop valve 9 therein.

Of course, adapters 13, of different inside diameters may be provided the chuck, such as conditions or preference may dictate.

Figure 3:
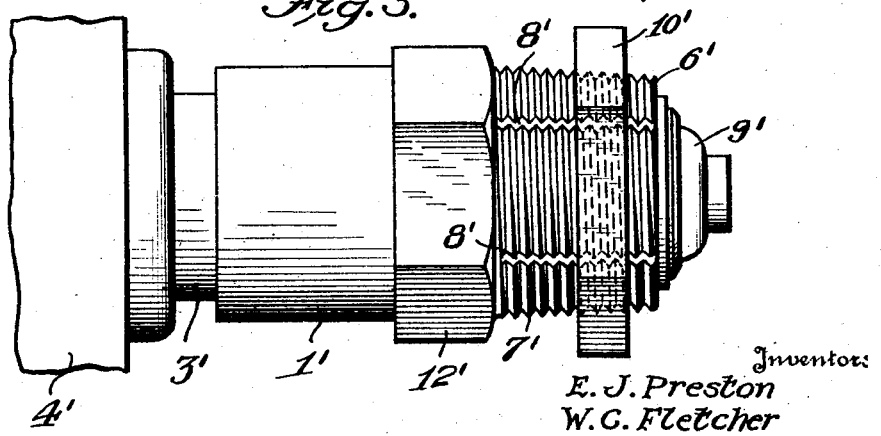
Figure 3 is a side elevation of a slightly modified form of the improved chuck.

In the Figure 3, we have shown a slightly modified form of the improved chuck, wherein the same comprises a metal body portion 1″, similar in construction and formation to the body 1 of the first mentioned embodiment of the invention, whereby a working connection may be established as between it and the spindle 3′ of a lathe 4′; the opposite end or portion of the chuck body 1″, being formed with chuck arms or work piece receiving means 6′, externally screw threaded as at 7′ and formed with a plurality of relatively spaced slots 8′ whereby to give flexibility to the work piece receiving means 6′ so that when the adjusting and locking nut 10′ is turned over the tapered outer peripheral and screw threaded surface thereof, said means 6′ will be flexed in a manner to either engage or disengage the adjacent portions of a pop valve 9′ inserted and snugly engaged therein. This nut 10′, instead of being formed with the spanner wrench receiving notches 11, is preferably of polygonal or multi-sided outer formation, hence, permitting it to be effectually engaged by a wrench or other suitable tool. Also, the intermediate portion of the body 1′ is formed with a multi-sided or nut formation 12′, instead of the spanner wrench receiving pockets or recesses 12, as described in connection with the preceding embodiment of the invention; permitting of the engaging of a wrench with the chuck body and the turning of the same into engagement with the screw threaded portion of the lathe spindle 3′.

Adapter or reducer devices, may, of course, be used in connection with the spring or flexible work piece receiving means 6′ of the type or character of chuck shown in the Figure 3, in the same fashion as are the adapter devices 13 used in connection with the chuck shown in the Figures 1 and 2.

In operation of our improved chuck and referring in particular, to the form illustrated in the Figures 1 and 2, the chuck is first set up with respect to the lathe spindle 3 by turning the internally screw threaded socket portion of the same onto said spindle. At this time, a pop valve to be machined is snugly engaged within the work piece receiving means 6 of the chuck and thereupon, the adjusting and locking nut 10 is turned outwardly along the tapered screw threaded portions 7 of said work piece receiving means 6, causing the segmental portions thereof to be flexed inwardly into a binding and securing engagement with the adjacent or received portions of said pop valve 9 and hence, immovably securing the same in position for machining within the chuck. In this connection, it will be noted that because of the continuity of securing engagement of the chuck with the pop valve 9, said valve, with its insertion in the means 6 will be effectually centered for the subsequent machining operation and furthermore, it will be secured in an immovable position without the forming of chuck jaw markings thereupon, which, as hereinbefore stated, require a deeper grinding of contact or seat portions thereupon.

In event that a smaller size of pop valve is to be secured by the improved chuck, an adapter of proper inside dimensions is selected and is snugly engaged in the flexible work-piece receiving means 6 of the chuck, in the manner as is shown in the Figure 1, whereupon the pop valve to be machined, is engaged within the adapter or reducer device indicated by the numeral 13 and the adjusting or locking nut 10 is then turned outwardly upon the screw threaded portions 7 of the segmental parts of the means 6 to flex the same into binding and securing engagement with the adjacent portions of said valve.

The species of invention disclosed in the Figure 3, is operated in a manner corresponding to the operation described in connection with that form or species of the invention illustrated in the Figures 1 and 2, with the exception, that instead of using a spanner wrench in connection with the thickened intermediate body portion of the chuck and with the adjusting and locking nut, a wrench of the ordinary straight jaw type is employed, the same being adjusted and engaged with the multi-sided formations or faces of the adjusting and locking nut 10' and the intermediate portion 12'.

Manifestly, the construction shown is capable of considerable modification, and such modification as is within the scope of our claims we consider within the spirit of our invention.

We claim:—

1. A chuck comprising a cylindrical body having an intermediately thickened portion formed therewith for dividing the same into an attaching end and a work holding end, said work holding end having a plurality of longitudinally disposed slots therein forming a plurality of gripping arms, the outer periphery of said work holding end being tapered and having screw threads thereon, an adapter receivable in the arms of said work holding end, said adapter having a plurality of slots therein forming gripping arms corresponding with the gripping arms of said work holding end, and a nut engageable with the tapered threaded periphery of the work holding end of the chuck whereby the latter may be forced into the arms of the latter may be forced into gripping engagement with said adapter and the pressure so exerted upon the arms of the work holding end of the chuck being transmitted to the arms of the adapter for causing the latter to grip the work held thereby.

2. A chuck comprising a body having a a work holding end, said work holding end having a recess formed therewith and extending throughout its length, said work holding end having a plurality of slots formed therein, each being of a length less than that of the recess formed therewith, a collet receivable in said recess and having a plurality of slots formed therein of a length less than that of the collet and equal to the length of the slots within said work holding end of the chuck, the outer periphery of said work holding end of the chuck being tapered and threaded, a nut engageable with said threaded tapered periphery of the work holding end of the chuck for causing a gripping engagement to be effected between the chuck and the work receivable in said collet.

3. A chuck comprising a cylindrical body having an internal intermediately positioned thickened portion, internal threads formed with one end of said body for receiving a lathe spindle, said intermediately thickened portion of the body forming a shoulder adjacent the inner extremity of the internal lathe spindle receiving threads, the peripheral portion of the opposed end of said body being tapered and threaded forming a work receiving end, said work receiving end having a recess therein extending throughout its entire length, said work receiving end of the body having a plurality of longitudinally disposed slots therein opening to the outer extremity of the work end and being of a length less than that of said work receiving end to form a plurality of gripping arms, a collet receivable in said recess of the work receiving end and having a plurality of longitudinally disposed slots therein opening at one extremity of the collet to provide a plurality of work holding and gripping arms, and a nut engageable with the tapered threaded periphery of said work gripping end of the body, whereby the said collet may be held into gripping engagement with the work receiving end of the body and the work receivable by said collet retained in gripping engagement therewith.

In witness whereof we have hereunto set our hands.

EARL J. PRESTON.
ALBERT W. REYNOLDS, Jr.
WILLIAM C. FLETCHER.